US010739219B2

(12) United States Patent
Han et al.

(10) Patent No.: US 10,739,219 B2
(45) Date of Patent: Aug. 11, 2020

(54) ION CHANNEL PRESSURE SENSOR AND MANUFACTURING METHOD OF THE SAME

(71) Applicant: KOREA UNIVERSITY RESEARCH AND BUSINESS FOUNDATION, Seoul (KR)

(72) Inventors: Chang-Soo Han, Seoul (KR); Kyoung-Yong Chun, Goyang-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 175 days.

(21) Appl. No.: 16/124,814

(22) Filed: Sep. 7, 2018

(65) Prior Publication Data

US 2019/0003911 A1 Jan. 3, 2019

Related U.S. Application Data

(63) Continuation of application No. PCT/KR2017/002418, filed on Mar. 7, 2017.

(30) Foreign Application Priority Data

Mar. 14, 2016 (KR) .................. 10-2016-0030242

(51) Int. Cl.
*G01L 9/18* (2006.01)
*G01L 1/20* (2006.01)
(Continued)

(52) U.S. Cl.
CPC ............ *G01L 9/18* (2013.01); *C08G 73/0266* (2013.01); *C08L 27/16* (2013.01); *C08L 79/02* (2013.01); *G01L 1/20* (2013.01); *G01L 7/08* (2013.01)

(58) Field of Classification Search
USPC .................................................. 73/700–756
See application file for complete search history.

(56) References Cited

U.S. PATENT DOCUMENTS 5,368,712 A * 11/1994 Tomich ................ C07K 14/001
204/403.06
2002/0182627 A1 12/2002 Wang et al.
(Continued)

FOREIGN PATENT DOCUMENTS

CN 209544281 U * 10/2019
KR 10-1210937 B1 12/2012
(Continued)

OTHER PUBLICATIONS

International Search Report for PCT/KR2017/002418 dated May 30, 2017.

*Primary Examiner* — Andre J Allen
(74) *Attorney, Agent, or Firm* — Hauptman Ham, LLP

(57) ABSTRACT

Provided are an ion channel pressure sensor and a manufacturing method of the same. The ion channel pressure sensor includes: a bottom storage including a bottom storage space in which an electrolyte is stored; a top storage including a top storage space in which an electrolyte is stored; a membrane disposed between the bottom storage and the top storage, the membrane including a plurality of through-holes; a plate-shaped bottom support disposed on a bottom surface of the bottom storage; a plate-shaped top support disposed on a top surface of the top storage; a power supply configured to apply a voltage between the electrolyte stored in the bottom storage space and the electrolyte stored in the top storage space; and an ammeter configured to detect a current flowing to the power supply.

12 Claims, 13 Drawing Sheets

(51) Int. Cl.
*C08L 79/02* (2006.01)
*C08G 73/02* (2006.01)
*C08L 27/16* (2006.01)
*G01L 7/08* (2006.01)

(56) References Cited

U.S. PATENT DOCUMENTS

| | | | |
|---|---|---|---|
| 2004/0262636 A1* | 12/2004 | Yang | H01L 21/0262 |
| | | | 257/200 |
| 2005/0017190 A1* | 1/2005 | Eversmann | G01N 33/4836 |
| | | | 250/370.14 |
| 2009/0045061 A1* | 2/2009 | Farrow | C25D 13/02 |
| | | | 204/471 |
| 2010/0132476 A1 | 6/2010 | Cheng et al. | |
| 2014/0158540 A1* | 6/2014 | Ohura | G01N 27/44791 |
| | | | 204/543 |

FOREIGN PATENT DOCUMENTS

| | | |
|---|---|---|
| KR | 10-1540177 B1 | 7/2015 |
| KR | 10-1597936 B1 | 2/2016 |

\* cited by examiner

ION CHANNEL PRESSURE SENSOR AND MANUFACTURING METHOD OF THE SAME

CROSS-REFERENCE TO RELATED APPLICATIONS

This application is a continuation of and claims priority to PCT/KR2017/002418 filed on Mar. 7, 2017, which claims priority to Korea Patent Application No. 10-2016-0030242 filed on Mar. 14, 2016, the entireties of which are both hereby incorporated by reference.

TECHNICAL FIELD

The present disclosure relates to a high-sensitivity and high-selectivity pressure sensor which simulates an ion channel in a natural sensory organ and a manufacturing method of the same.

BACKGROUND

An ion channel is essential means for sustaining life in all living cells. An ion channel continues to transport ions through cell membranes. Main functions of ion channels are essential for sensory organs to maintain homeostasis.

Basically, when a receptor is stimulated and activated from various environmental forces such as heat, light, smell, sound, and pressure, an ion channel provides an electrical signal generated by ion motion across a cell membrane to a nerve.

Until now, several research groups have reported performances of nature-inspired artificial ion channel sensors. Among the performances, there is almost no pressure sensing using an ion channel system. In the biological field, it is known that mechanotransduction corresponds to mechanical stimuli in mechanosensory receptors that change in cell membrane potential. In mechanosensory receptors, a stimulus may be deflection of a hair-cell stereocilia in a cochlea.

In particular, although the exact mechanism is not yet known, a stretch-activated ion channel is one of the pressure-detectable configurations which exist in microbes, yeast, and plants.

Most studies for pressure sensing are limited to silicon and polymer-based devices. These devices may include a transistor, pressure sensing, capacitive sensing, piezoelectric sensing, piezoresistive, and optical sensing.

These systems are coupled to input/output regions which cause unstable electrical properties, low selectivity, high operating power, and static feeling. For example, the main concern of piezoelectric sensors results from a high internal resistance and is affected by an input impedance of a readout electrical circuit and low sensitivity to temperature and static force.

Capacitive sensors suffer from disadvantages that noise is associated with an electric field interaction and fringe effect causing the demand of a particular electronic circuit should be removed.

A biological ion channel system configured to sense external stimuli basically includes receptors and nanopores. The hybrid design of ion channels is effectively evolving. The receptor is mechanically triggered by an external stimulus, and the nanopore electrochemically performs a function to provide a path for ion transport. The two elements are separated from each other. Ion channels have important properties, as follows. First, the ion channel is passive in the sense that it does not need an energy source to operate them. Second, highly selective recognition of substrates with high receptivity is provided. Moreover, a direct signal is obtained from ion transport across a membrane along an electrochemical gradient without an additional amplifier system or electronic circuit. An ion channel is configured to carry ions at a very high speed (more than 106 s−1 for ions and less than 109 s−1 for water) in a nanoscale or microscale dimension without concern about energy consumption. Thus, an ion channel may be used as a sensors to monitor physical parameters including acceleration, temperature, sound waves, fluid engineering, and pressure.

Many functional features may transfer short response times, low power consumption, dynamic spatial resolution, flexibility, and integration on various soft and hard surfaces.

SUMMARY

Example embodiments of the present disclosure provide a high-sensitivity and high-selectivity ion channel pressure sensor which is driven at low operating power.

Example embodiments of the present disclosure provide an ion channel pressure sensor which is capable of detecting a pressure at a curved part or any shape of a human body with flexibility.

An ion channel pressure sensor according to example embodiment of the present disclosure includes: a bottom storage including a bottom storage space in which an electrolyte is stored; a top storage including a top storage space in which an electrolyte is stored; a membrane disposed between the bottom storage and the top storage, the membrane including a plurality of through-holes; a plate-shaped bottom support disposed on a bottom surface of the bottom storage; a plate-shaped top support disposed on a top surface of the top storage; a power supply configured to apply a voltage between the electrolyte stored in the bottom storage space and the electrolyte stored in the top storage space; and an ammeter configured to detect a current flowing to the power supply. The top support is defined by an external pressure, the bottom storage space is vertically aligned with the top storage space, and the electrolyte is allowed to move through the through-hole of the membrane by the external pressure.

In example embodiments, the electrolyte may include polyaniline (PANi).

In example embodiments, the top support may include a polyvinylidene fluoride (PVDF) film, a mica film or a glass film.

In example embodiments, the top storage may include a silicon-based tape or a carbon tape.

In example embodiments, the top support may have the same structure and shape as the bottom support and the top storage may have the same structure and shape as the bottom storage.

In example embodiments, the membrane may include polycarbonate track etched (PCTE).

In example embodiments, a diameter of the through-hole of the membrane may be between 10 nanometers (nm) and 1 micrometer (μm), a density of the through-hole of the membrane may be between $2 \times 10^7 / cm^2$ and $6 \times 10^8 / cm^2$, and a thickness of the membrane may be between 6 and 11 μm.

In example embodiments, each of the top and bottom storages may be made of a conductive material.

In example embodiments, the ion channel pressure sensor may further include: a top electrode disposed between a bottom surface of the top support and a top surface of the top storage to extend and disposed in a contact space with the electrolyte stored in the top storage space; and a bottom electrode disposed between a top surface of the bottom support and a bottom surface of the top storage to extend and disposed in a contact space with the electrolyte stored in the bottom storage space. The top and bottom electrodes may be wire-type electrodes. The top and bottom electrode may be electrically connected to the power supply.

In example embodiments, the ion channel pressure sensor may further include: a top electrode disposed between the top storage space of the top storage and the top support; and a bottom electrode disposed between the bottom storage space of the bottom storage and the bottom support. The top and bottom electrodes may be electrically connected to the power supply.

A manufacturing method of an ion channel pressure sensor according to example embodiments of the present disclosure includes: mounting a bottom storage on a bottom support, the bottom storage including a bottom storage space in which an electrolyte is stored; installing a membrane including a plurality of through holes on the bottom storage; installing a top storage on one surface of the membrane, the top storage including a top storage space in which an electrolyte is stored; and installing a top support on the top storage. The top storage and the bottom storage are symmetrical with respect to the membrane.

In example embodiments, the top support and the top storage may be fixed by an adhesive and the bottom support and the bottom storage may fixed by an adhesive.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1A:
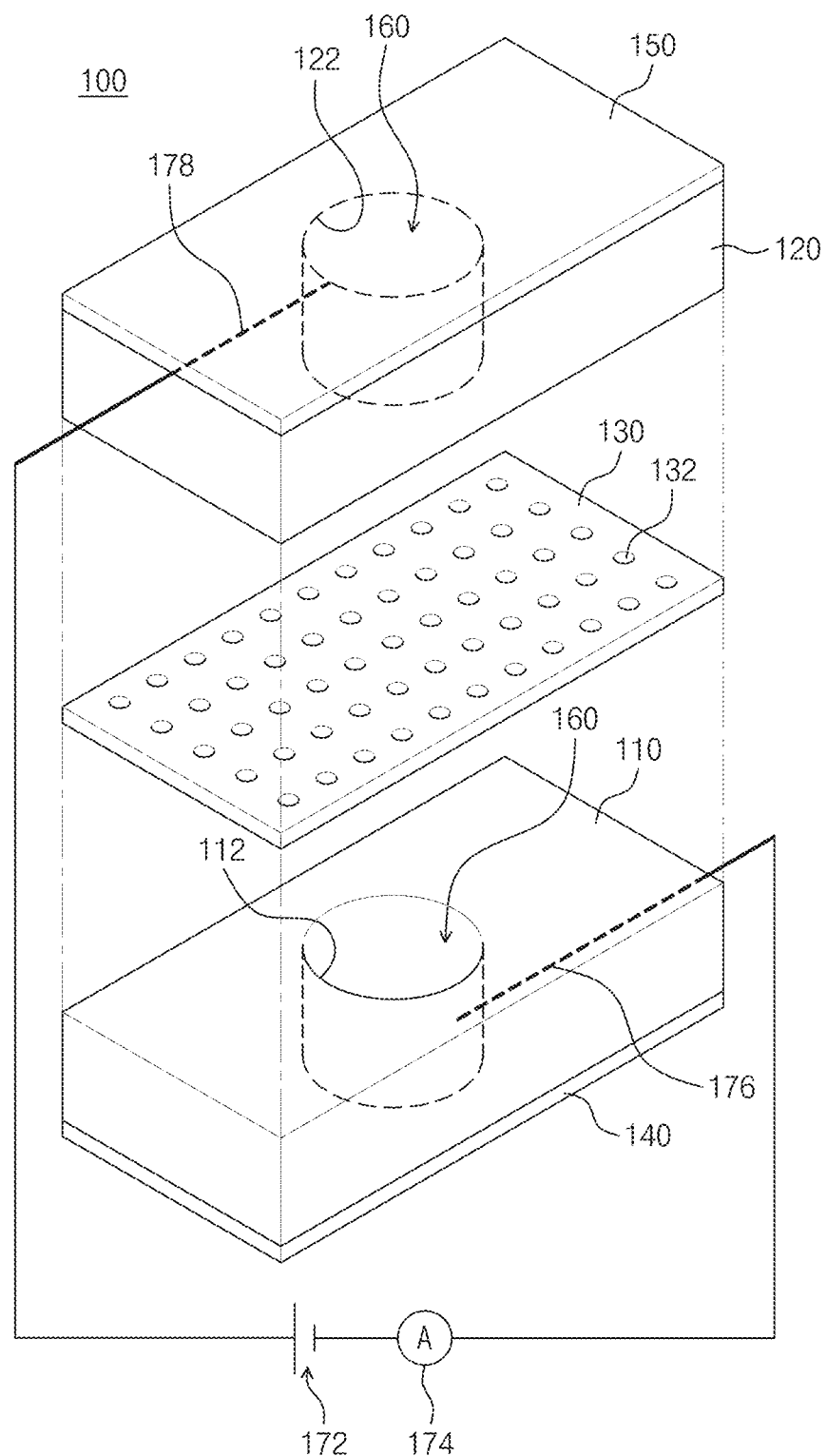
FIG. 1A. is an exploded perspective view of an ion channel sensor according to an example embodiment of the present disclosure.

An ecological ion channel induced by an external stimulus is a very important unit to maintain the life of the natural world. An ion channel sensor which has high selectivity and resolution by simulating such an ion channel is provided.

The ion channel sensor sense a pressure using resistance variation depending on movement of ions constituting electrolytes of opposite sides of the ion channel due to an external pressure, i.e., various environmental forces such as touch, bending, warpage, and vibration.

Such an ion channel sensor device basically includes two elements including a receptor to recognize a pressure and a nanopore to control ion movement. Thus, a wide variety of ion channel sensors may be manufactured according to types and functions of receptors and nanopores.

In general, a pressure sensor mainly includes a silicon or polymer-base element such as a piezoelectric element, a capacitive element, and an optical element. However, these elements suffer from disadvantages such as unstable electrical characteristics, low selectivity, and high operating power.

An ion channel pressure sensor according to example embodiments of the present disclosure may include a nano-membrane, a plurality of nano-channel portions (through-holes) functioning as an ion channel which provide an electrolyte path through the nano-membrane, an electrolyte disposed at opposite sides of the nano-channel portion, and a storage unit for packaging the electrolyte.

In an example embodiment of the present disclosure, an electrolyte material includes a general liquid, sol-gel, and a solid-state material having conductivity. The electrolyte material may control various regions of a pressure sensing range. The general liquid, sol-gel, and solid-state materials may include an aqueous solution and a liquid metal containing ions such as sodium, potassium, lithium, magnesium, and the like having ionic conductivity. The sol-gel phase includes conductive polymers and bio-gel materials (ionic gels such as agarose and gelatin). The solid-state material may include a material in which a resistance of a solid is variable depending pressure when including carbon-based nanotubes, fibers, and graphene.

According to an exemplary embodiment of the present disclosure, we propose an ion channel pressure sensor may include a receptor and a nanopore membrane. The ion channel pressure sensor may have a laminated structure including a receiver (or support) of a polymer material, an electrolyte, and a nanopore membrane. The ion channel pressure sensor may provide high sensitivity, responsivity, selectivity, and dynamic characteristics. The sensitivity of the ion channel pressure sensor may achieve a value in the level less than or equal to 5.6 kPa−1. A reaction time may be in the level less than or equal to 11 ms at a frequency of 1 hertz (Hz). Stability was identified as a current signal for over 10,000 cycles of loading-unloading. A change in sensitivity was not found in a wet test. In addition, a patchable ion channel pressure sensor successfully detected a human blood pressure pulses.

Example embodiments will now be described more fully with reference to the accompanying drawings, in which some example embodiments are shown. Example embodiments may, however, be embodied in many different forms and should not be construed as being limited to the embodiments set forth herein; rather, these example embodiments are provided so that this disclosure will be thorough and complete, and will fully convey the scope of example embodiments of the present disclosure to those of ordinary skill in the art. In the drawings, the thicknesses of layers and regions are exaggerated for clarity. Like reference characters and/or numerals in the drawings denote like elements, and thus their description may be omitted.

FIG. 1A. is an exploded perspective view of an ion channel sensor according to an example embodiment of the present disclosure.

Figure 1B:
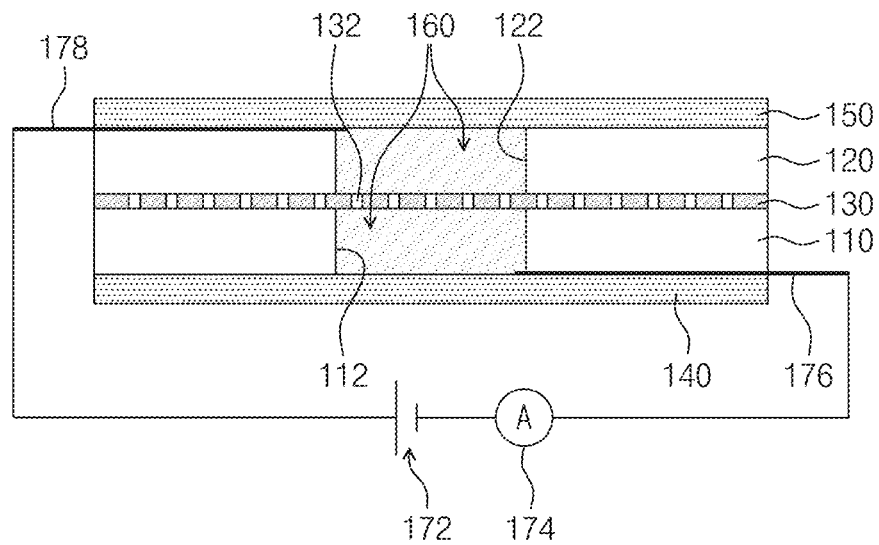
FIG. 1B is a cross-sectional view of the ion channel sensor in FIG. 1A.

FIG. 1B is a cross-sectional view of the ion channel sensor in FIG. 1A.

Figure 1C:
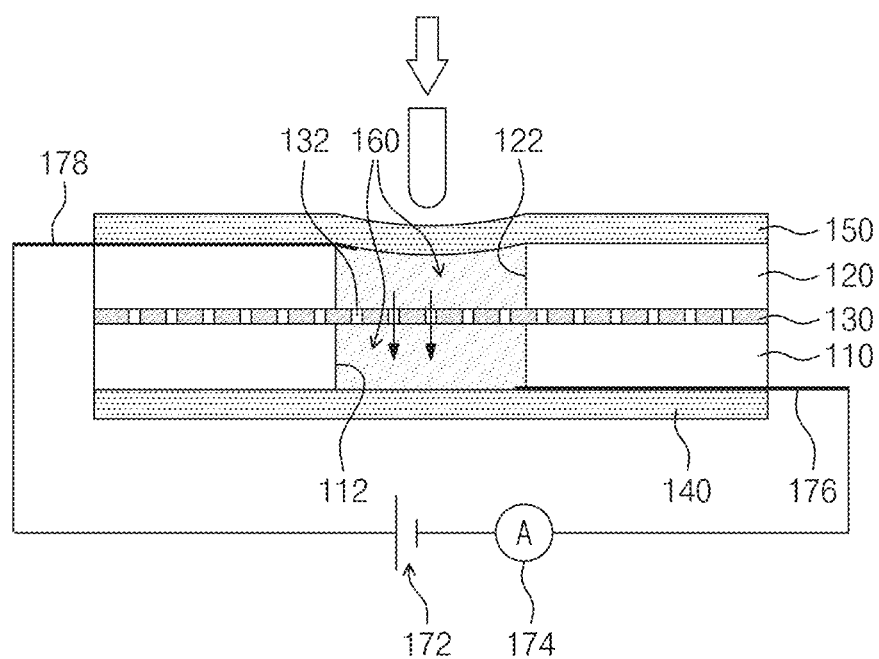
FIG. 1C is a cross-sectional view of the ion channel sensor in FIG. 1A when an external force is applied.

FIG. 1C is a cross-sectional view of the ion channel sensor in FIG. 1A when an external force is applied.

Figure 1D:
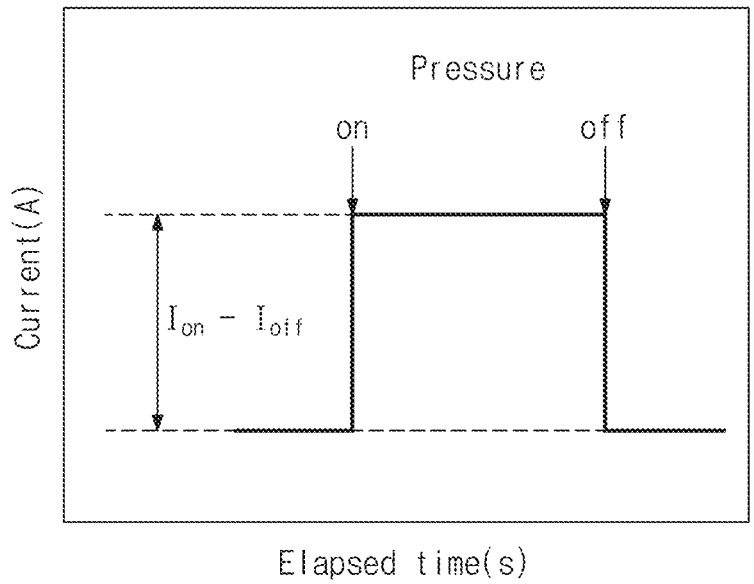
FIG. 1D shows a current waveform when an external force is applied in the form of a pulse.

FIG. 1D shows a current waveform when an external force is applied in the form of a pulse.

Figure 1E:
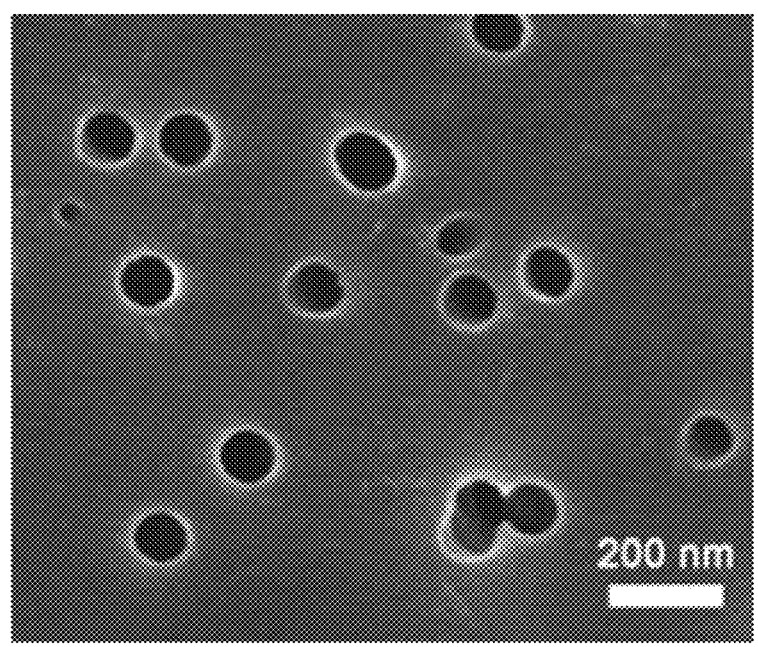
FIG. 1E is a scanning electron microscopy (SEM) image of a membrane in FIG. 1A.

FIG. 1E is a scanning electron microscopy (SEM) image of a membrane in FIG. 1A.

Referring to FIGS. 1A to 1E, an ion channel sensor includes a bottom storage 110, a top storage 120, a membrane 130, a bottom support 140, a top support 150, a power supply 172, and an ammeter 174. The bottom storage 110 includes a bottom storage space 112 in which an electrolyte 160 is stored. The top storage 120 includes a top storage space 122 in which an electrolyte 160 is stored. The membrane 130 is disposed between the bottom storage 110 and the top storage 120 and includes a plurality of through-holes. The top support 140 is disposed on a bottom surface of the bottom storage 110 and has a plate shape. The top support 150 is disposed on a top surface of the top storage 120 and has a plate shape. The power supply 172 applies a voltage between the electrolyte 160 stored in the bottom storage space 112 and the electrolyte 160 stored in the top storage space 122. The ammeter 174 detects a current flowing to the power supply 172. The top support 150 is deformed by an external pressure, the bottom storage space 112 is vertically aligned with the top storage space 122, and the electrolyte 160 may move through the through-hole of the membrane 130.

The bottom storage 110 may be a silicon-based film (or tape) or a conductive carbon film (or tape). The bottom storage 110 may have a shape of a plate having a constant thickness and be deformed by an external pressure. The bottom storage 110 includes the bottom storage space 112, which may be formed by punching a film-type bottom storage. A film thickness of the bottom storage 110 may be between several tens of Fm and several hundreds of Fm. A sectional area of the bottom storage space 112 may be less than or equal to several square centimeters (cm²). The bottom storage space 112 may be filled with an electrolyte. Adhesive layers may be disposed on the top and bottom surfaces of the bottom storage 110, respectively.

The top storage 120 may have the same structure and shape as the bottom storage 110. The top storage 120 may include a silicon-based film or a carbon film. The top storage 120 may have a shape of a plate having a constant thickness and be deformed by an external pressure. The top storage 120 may include the top storage space 122, which may be formed by punching a film-type top storage. A film thickness of the top storage 120 may be between several tens of m and several hundreds of μm. A sectional area of the top storage space 122 may be less than or equal to several square centimeters (cm²). The top storage space 112 may be filled with an electrolyte. Adhesive layers may be disposed on the top and bottom surfaces of the top storage 120, respectively. The top storage space 122 may be vertically aligned with the bottom storage space 112.

The electrolyte 160 may include a general liquid-state material, a sol-gel material or a solid-state material having conductivity. The general liquid-state material, the sol-gel material, or the solid-state material may include an aqueous solution and a liquid metal containing ions such as sodium (Na), potassium (K), lithium (Li), and magnesium (Mg). The sol-gel material includes a conductive polymer, and a bio-gel material (ionic gel such as agarose and gelatin). The solid-state material may include a carbon-based nanotube, fiber, and graphene and include a material in which a resistance of a solid is variable depending on a pressure. More specifically, the electrolyte may include a polyaniline (PANi) solution, a potassium chloride KCl (1M) solution or an ionic liquid (1-ethyl-3-methylimidazolium ethyl sulfate).

More specifically, the polyaniline (PANi) solution is prepared, as follows.

An ammonium sulfate solution is prepared by dissolving 0.286 g (1.25 mmol) of ammonium persulfate (AP) in distilled 1 mL of water. The aniline solution is prepared by mixing 0.921 mL (1 mmol) phytic acid, 0.458 mL (5 mmol) aniline, and 2 mL DI water. Then, the ammonium sulfate solution and the aniline solution are cooled and mixed in a refrigerator for 4 hours. As a result, the polyaniline solution is obtained with partial gelation.

The membrane 130 may include a plurality of through-holes or nanopores having a constant thickness. The membrane 130 may be polycarbonate track etched (PCTE). The through-hole of the membrane 130 may have a diameter of 10 nanometers (nm) to 1 micrometer (μm), the density of the through-hole of the membrane 130 may be between $2 \times 10^7$ cm² and $6 \times 10^8$ cm², and the thickness of the membrane 130 may between 6 and 11 μm. The through-hole may provide a path along which the electrolyte 160 in the storage space 122 and the electrolyte 160 in the bottom storage space 112 move.

The bottom support 140 may be disposed on the bottom surface of the bottom storage 110 to seal the electrolyte 160 stored in the bottom storage space 112. The bottom support 140 may operate as a receiver that is deformed in response to an external pressure. A material of the bottom support 140 may be a polyvinylidene fluoride (PVDF) film, a mica film or a glass film. The thickness of the bottom support 140 may be several tens to several hundreds of μm.

The top support 150 may be disposed on the bottom surface of the top storage 120 to seal the electrolyte 160 stored in the top storage space 122. The top support 150 may operate as a receiver that is deformed in response to external pressure. A material of the top support 150 may be a polyvinylidene fluoride (PVDF) film, a mica film or a glass film. The thickness of the top support 150 may be several tens to several hundreds of μm. The top support 150 may have the same structure and shape as the bottom support 140.

The power supply 172 may apply a voltage between the electrolyte 160 stored in the top storage space 122 and the electrolyte 160 stored in the bottom storage space 112. As the electrolyte 160 moves after passing through the membrane 130, a current flowing through the power supply 172 may be measured.

The ammeter 174 may measure a current flowing through the power supply 172. The current may increase linearly or nonlinearly according to a pressure applied to the ion channel pressure sensor.

To apply a voltage between the electrolyte 160 stored in the top storage space 122 and the electrolyte 160 stored in the bottom storage space 112, a top electrode 179 may be disposed to be in contact with the electrolyte 160 stored in the top storage space 122 and a bottom electrode 176 may be disposed to be in contact with the electrolyte 160 stored in the bottom storage space 112. The top electrode 178 and the bottom electrode 176 may have a wire shape or a plate shape. A wire-shaped electrode may be easily bent and maintain its original electrical characteristics even when repeated deformation occurs. The wire-shaped top electrode 178 may extend outwardly along between a top surface of the top storage part 120 and a bottom surface of the top support 150. The wire-shaped bottom electrode 176 may extend outwardly along between a bottom surface of the bottom storage 110 and a top surface of the bottom support 140.

Hereinafter, a manufacturing method of an ion channel pressure sensor will now be described. The manufacturing method includes: mounting a bottom storage 110 on a bottom support 140, the bottom storage 110 including a bottom storage space in which an electrolyte is stored; installing a membrane 130 including a plurality of through holes on the bottom storage 110; installing a top storage 120 on the membrane 130, the top storage 120 including a top storage space in which an electrolyte is stored; and installing a top support 150 on the top storage 120. The top storage 120 and the bottom storage 110 may be symmetrical with respect to the membrane 130. The top support 150 and the top storage 20 may be fixed by an adhesive, and the bottom support 140 and the bottom storage 110 may be fixed by an adhesive. The membrane 130 may be fixed to a bottom surface of the top storage 120 and a top surface of the bottom storage 110 by an adhesive.

The bottom storage 110 and the top storage 120 may be a silicone-based double-sided adhesive film. The membrane 130 may be a PCTE. The bottom support 140 and the top support 150 may be a PVDF film, a mica film or a glass film. The electrolyte may be PANi.

The top support 150 or the bottom support 110 may be a receptor deformed by an external mechanical stimulus. The deformation of the top support 150 or the bottom support 110 may cause an ion motion across the membrane and provide a current variation when a voltage is applied by a power supply.

When a pressure or an external stimulus is removed, the supports 140 and 150 are restored to their original shapes and, at the same time, the ions flow back across the membrane 130 and cause a restoration to an initial current value.

Referring to FIG. 1E, the through-hole of the membrane 130 has a diameter of 100 nm. The density of the through-hole is $4 \times 10^8$ holes/cm$^2$. The power supply 172 is connected to the upper electrode 178 and the lower electrode 176. The electrode has an Ag/AgCl structure, and an area of the electrode is $20 \times 15$ mm$^2$.

To measure a current response of the ion channel pressure sensor to mechanical stimuli, a computer controlled stepping motor and a force sensor were used to apply an external pressure with a frequency up to 1 Hertz (Hz).

Figure 2A:
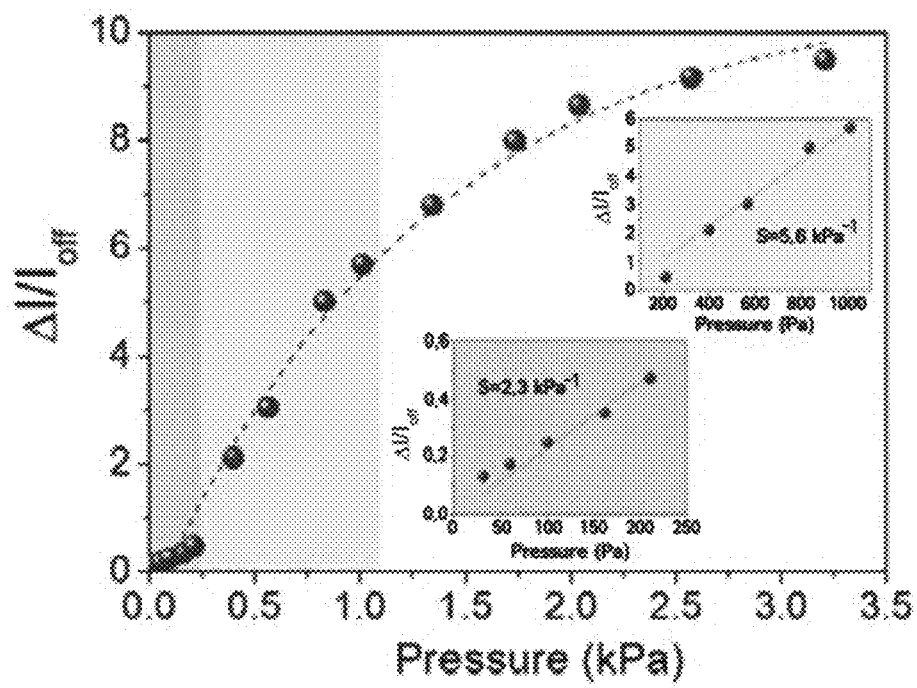
FIG. 2A shows a relative current variation depending on an external pressure in an ion channel sensor according to an example embodiment of the present disclosure.

FIG. 2A shows a relative current variation depending on an external pressure in an ion channel sensor according to an example embodiment of the present disclosure.

Referring to FIG. 2A, a current generated across the membrane 130 by a bias of the power supply 172 may vary depending on an increasing load. The increasing load may induce an ion flow rate. Sensitivity S of the ion channel pressure sensor is defined as $S=(\Delta I/I_{off})/\Delta p$ as the slope of a curve, where $\Delta p$ means a change of an applied pressure and $\Delta I$ and $I_{off}$ mean a relative variation of a current and a current without an applied pressure, respectively. A ratio of the current variation ($\Delta I/I_{off}$) is calculated based on a measured current value and is plotted as a function of the applied pressure. A size of the ion channel pressure sensor is 300 mm$^2$ in square.

A current exhibited exponential dependence on an ON state in which a pressure was applied. However, the current exhibited an approximate linear relationship between $\Delta I/I_{off}$ and an applied pressure P in the pressure range of 0 kPa to 3.5 kPa. Sensitivity may be divided into two regions, $S=2.3$ kPa$^{-1}$ and 5.6 kPa$^{-1}$, based on about 1 kPa. A value of the sensitivity is higher than about $5 \times 10^{-3}$ to 0.55 kPa$^{-1}$ that another typical pressure sensor has.

Increased sensitivity at high pressures may result from a behavior of ionic motion induced between deformation of a receptor and interaction at an electrolyte and also result from the nature of the receptor. The nature of the receptors may be stiffness or hardness.

A receiver (or a top support or a bottom support) may serve as tunable triggers for determination of the ion motion behavior across the membrane 130. An important consideration for the receiver is to ensure that the current amplitudes have specific characteristics. A dynamic signal shape may appear according to another receptor type.

We selected three materials having different stiffnesses (PVDF, mica, and glass) as receptors (or supports). The thickness of the PVDF is 30 μm, the thickness of the mica is 45 μm, and the thickness of the glass is 30 μm.

When a mica plate is applied as a receiver (or support), a shape of an output current signal is similar to that of PVDF except for a low pressure. The sensitivity when the mica is applied ($S=0.47$ kPa$^{-1}$) is lower than that of PVDF. When a glass plate (30 μm) is used as the receiver (support), a sensitivity slope has a sensitivity of 0.77 kPa$^{-1}$ and is almost linear in a region below 1 kPa.

As a pressure is applied, the ion channel pressure sensor has a unique deformation according to different receptors and the receptors lead to various useful linewidths to sense the pressure. From this result, the ion channel pressure sensor may provide a unique signal shape, a dynamic output, and feasible control of bandwidth.

To estimate dynamic pressure detection, a relative variation of current was measured while increasing a load.

Figure 2B:
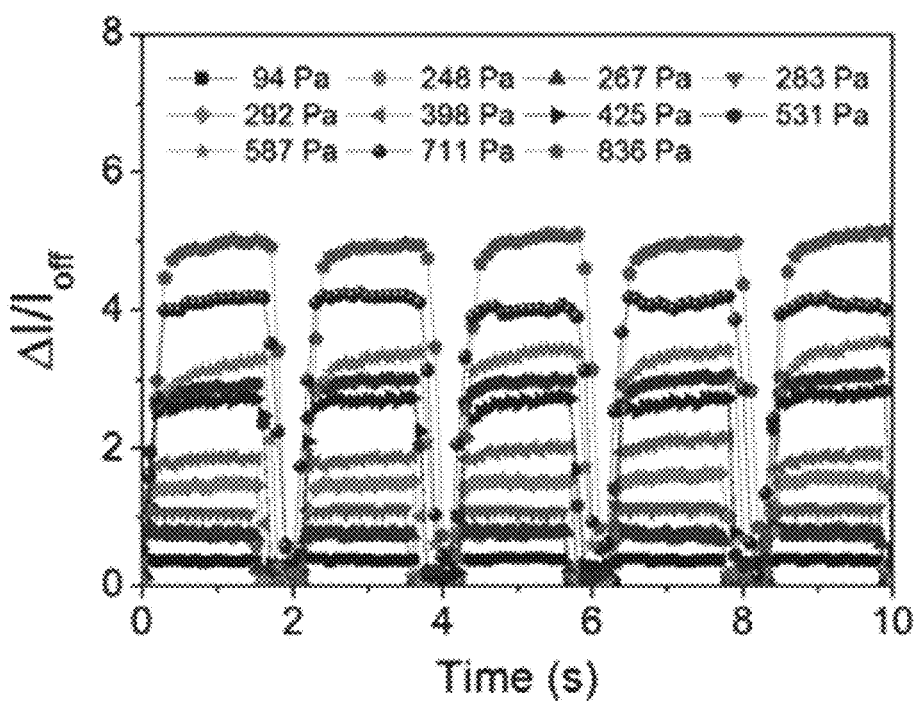
FIG. 2B shows a response of an ion channel sensor to various applied pressures.

FIG. 2B shows a response of an ion channel sensor to various applied pressures.

Referring to FIG. 2B, the pressure sensor stably has a continuous response to various loads without noise for all pressure ranges. A pressure of 94 Pa is sensed. The pressure of 94 Pa corresponds to a force of 3 gf on a PVDF surface of 300 mm$^2$.

Figure 2C:
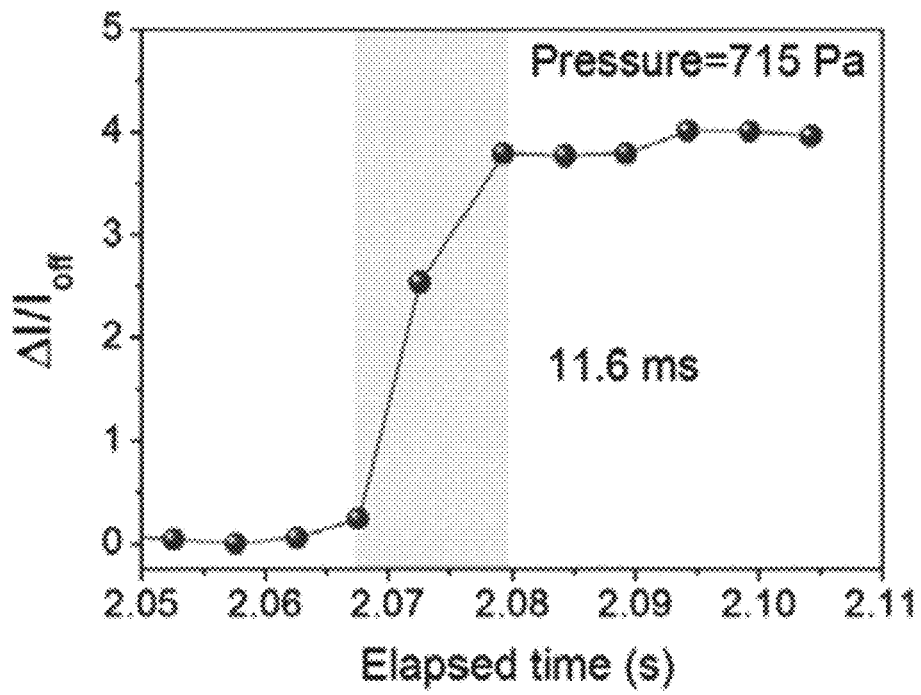
FIG. 2C shows a response of an ion channel sensor to a predetermined applied pressure.

FIG. 2C shows a response of an ion channel sensor to a predetermined applied pressure.

Referring to FIG. 2C, a current response to a load was immediate and significant delaying time was not observed. The ion channel sensor has a response time of 12 ms at a pressure of 715 Pa or less and a frequency of 0.5 Hz.

Figure 2D:
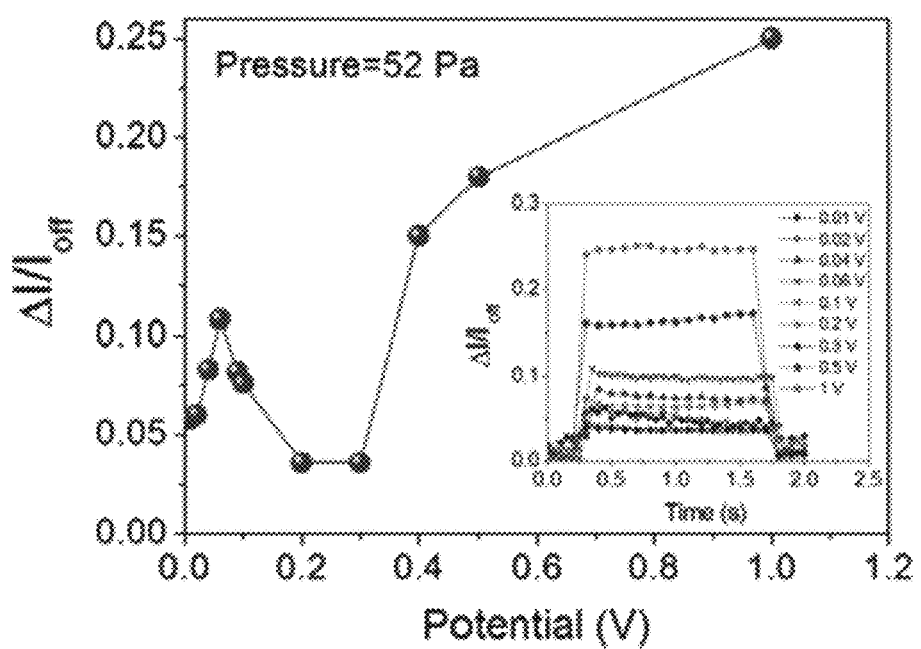
FIG. 2D shows a current variation under various potentials with a fixed pressure (52 Pa).

FIG. 2D shows a current variation under various potentials with a fixed pressure (52 Pa).

Referring to FIG. 2D, the ion channel sensor exhibits a unique current characteristic. The current characteristic corresponds to a cyclic voltammetry (CV) curve of a polyaniline (PANi) electrolyte. For an applied voltage between 0.1 and 0.3 volt, current variation decreases depending on an applied pressure. On the other hand, the slope of the other voltage region increases depending on the applied pressure. This result may be caused by an electrochemical reaction of a PANi solution to voltage variation. From cyclic voltammetry (CV) of PANi, positions of reduction and oxidation exist in a similar range of current drop of the ion channel sensor. A working voltage is as low as 10 mV.

Figure 2E:
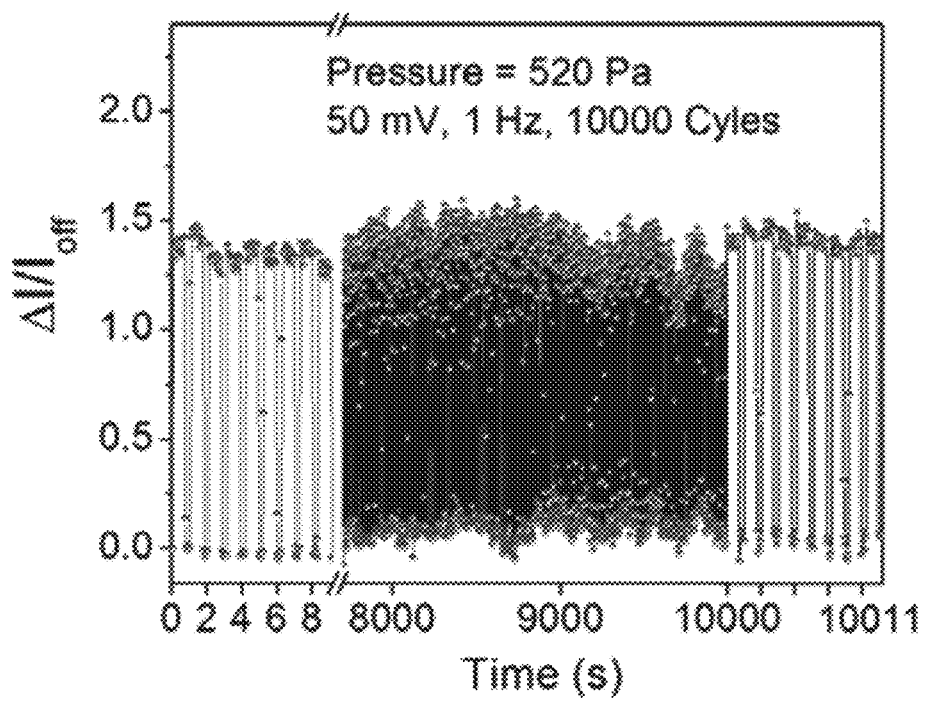
FIG. 2E shows stability of current response of an ion channel sensor.

FIG. 2E shows stability of current response of an ion channel sensor.

Referring to FIG. 2E, we have demonstrated stability of the ion channel pressure sensor at a pressure of 520 Pa and a frequency of 1 Hz with a bias of 50 mV. A typical input pressure signal is a pulse signal. A consistent current amplitude for the applied pressure is shown for the repeated 10,000 loading-unloading cycles, which refers to reliability of a pressure sensor.

Figure 3A:
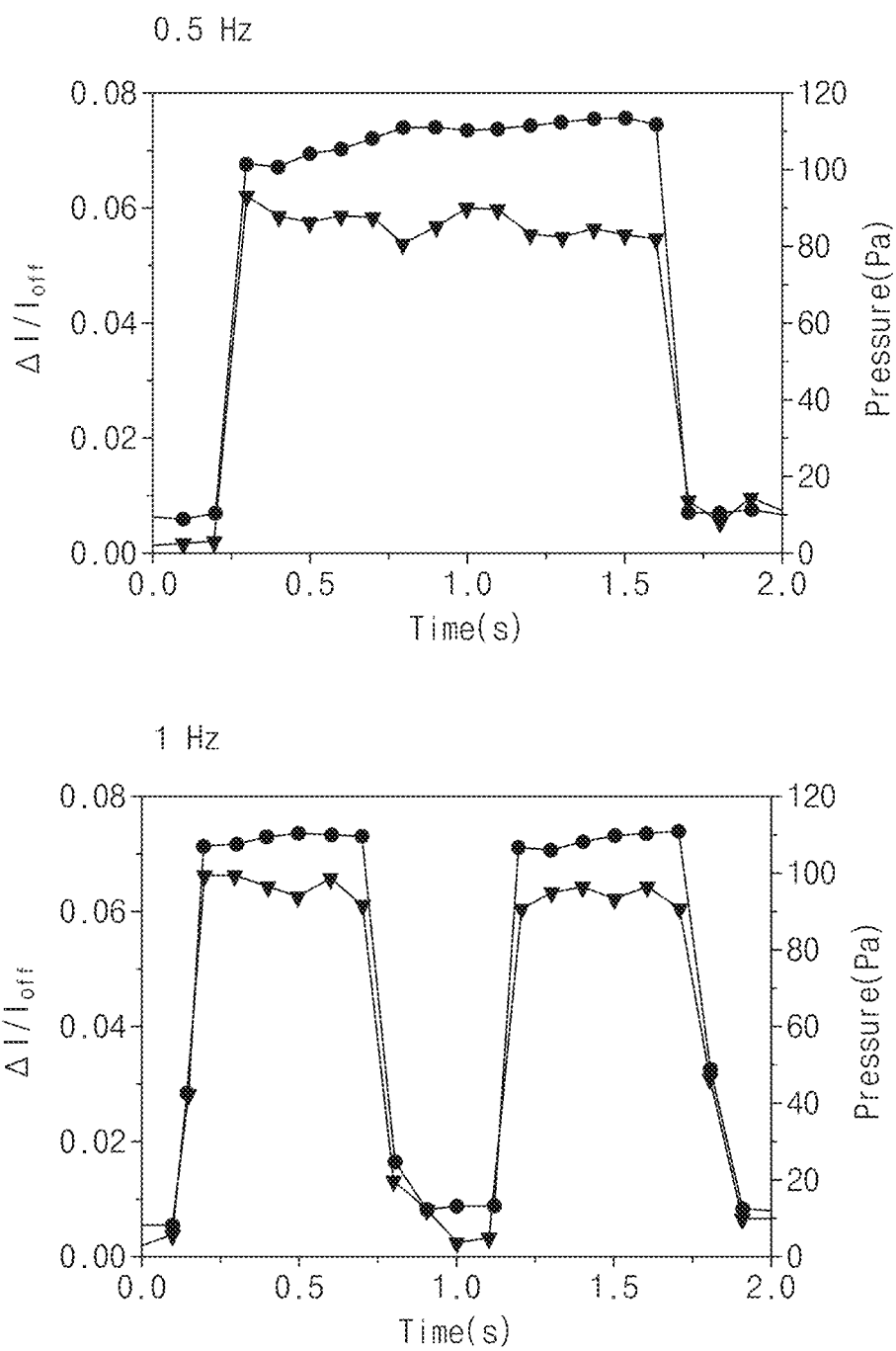
FIG. 3A shows a current response at various frequencies at a fixed pressure.

FIG. 3A shows a current response at various frequencies at a fixed pressure.

Referring to FIG. 3A, time-resolved measurements were performed to investigate the response behavior of a sensor to external loadings. An output current variation was observed at a bias of 0.1 V, a pressure of 90 Pa, and frequencies of 0.5 Hz and 1 Hz. A current line shape is almost the same as an attraction load shape at a low frequency, and a fast response was observed without signal degradation. For long time periods, the current amplitudes were well observed.

We showed that other important factors might have an influence on sensing performance and type of a receptor. An electrolyte and a membrane are factors to investigate the performance of an ion channel device for pressure sensing. PCTE membrane having various pore diameters were selected to investigate pressure sensing characteristics.

Figure 3B:
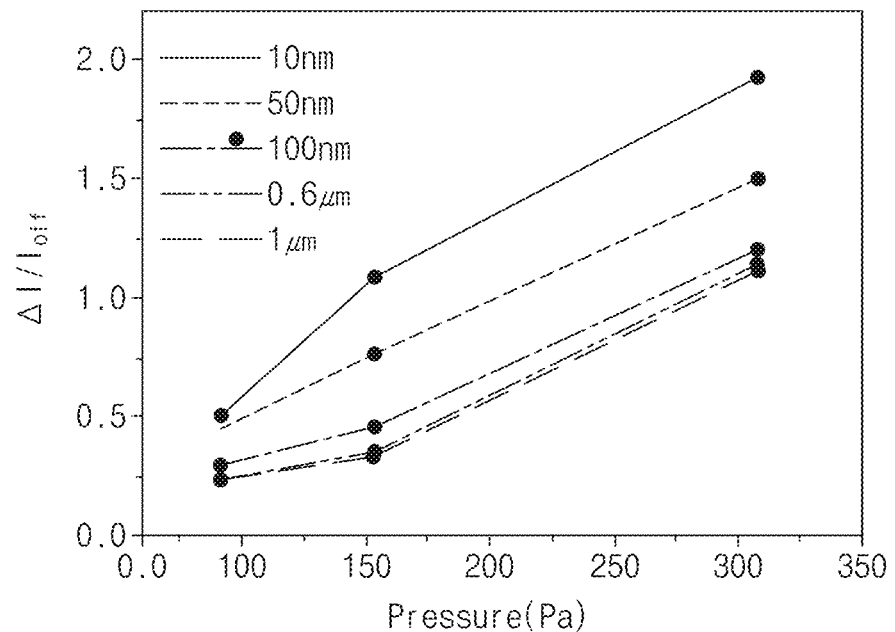
FIG. 3B shows a current response depending a membrane having various pore diameters.

FIG. 3B shows a current response depending a membrane having various pore diameters.

Referring to FIG. 3B, pore diameters of membranes were 10 nm, 50 nm, 100 nm, 0.6 µm, and 1 µm, respectively. The current variation increases as the pore diameter increases. However, there is no particular difference under a pore diameter of 100 nm or less. In general, since an effective pore area increases depending on a pore diameter, a current amplitude may be in proportion to the pore diameter of the membrane. Pore densities of $6\times10^8$, $4\times10^8$, $3\times10^7$, and $2\times10^7$ pores/cm$^2$ correspond to pore diameters of 10, 100, 600, and 1,000 nm, respectively. We calculated the effective pore area through which the ions can permeate the membrane. A ratio of the effective pore area is 1:66:180:333 (10:100:600:1000 nm). Theoretically, the increase in current is in proportion to the square of a pore diameter. However, the current variation did not show any difference than the theory in a test.

We investigated the effect of an electrolyte on a current reaction of the ion channel pressure sensor.

Figure 3C:
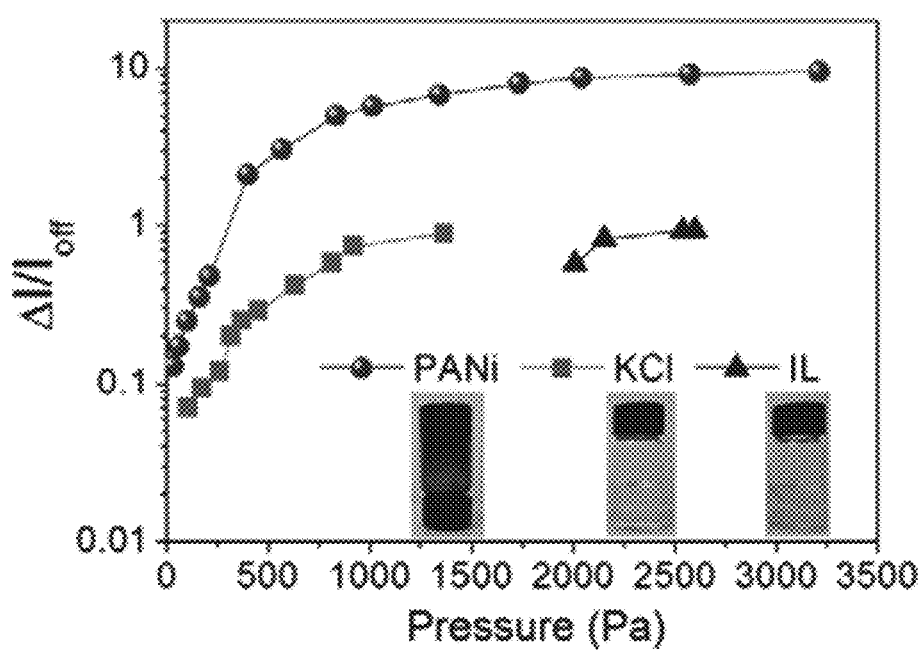
FIG. 3C shows a current response of an ion channel sensor depending on various electrolytes.

FIG. 3C shows a current response of an ion channel sensor depending on various electrolytes.

Referring to FIG. 3C, an electrolyte may be a polyaniline (PANi) solution, a potassium chloride KCl (1M) solution or an ionic liquid (IL, 1-ethyl-3-methylimidazolium ethyl sulfate) solution. These solutions are different in ion mobility and ion conductivity. A potassium chloride solution and an ionic liquid solution showed a current variation as small as 0.1 times compared with a polyaniline solution. In addition, measurable pressure sensing ranges are different from each other.

For the potassium chloride (KCl) solution, the current variation converges early near 1.5 kPa relative to the polyaniline (PANi) solution. The ionic liquid solution is unstable in a low pressure range where a pressure response is less than or equal to 2 kPa. The convergence of the current response is similar to the convergence of the current response of the potassium chloride solution. We guess a difference in pressure sensing as a difference in ionic conductivity of each electrolyte. Values of ionic conductivity measured by the ion conductivity meter of each electrolyte are 57.4 mS·cm$^{-1}$ (PANi), 125.8 mS·cm$^{-1}$ (KCl), and 3.4 mS·cm$^{-1}$ (IL).

A new polyaniline solution (PANi solution) is diluted to 10 ml in 10 ml of water and decreases in ionic conductivity as compared to an original one. However, the gel type of the polyaniline solution is known to have an ionic conductivity of 0.1 S·cm$^{-1}$. Higher electrical electrolytes may provide good performance to the ion channel pressure sensors. The electrolyte may be an important factor in determining the behavior of a pressure response. The control of linewidth may be conducted.

A selectivity for pressure sensing of the ion channel pressure sensor was investigated in terms of temperature and relative humidity.

Figure 3D:
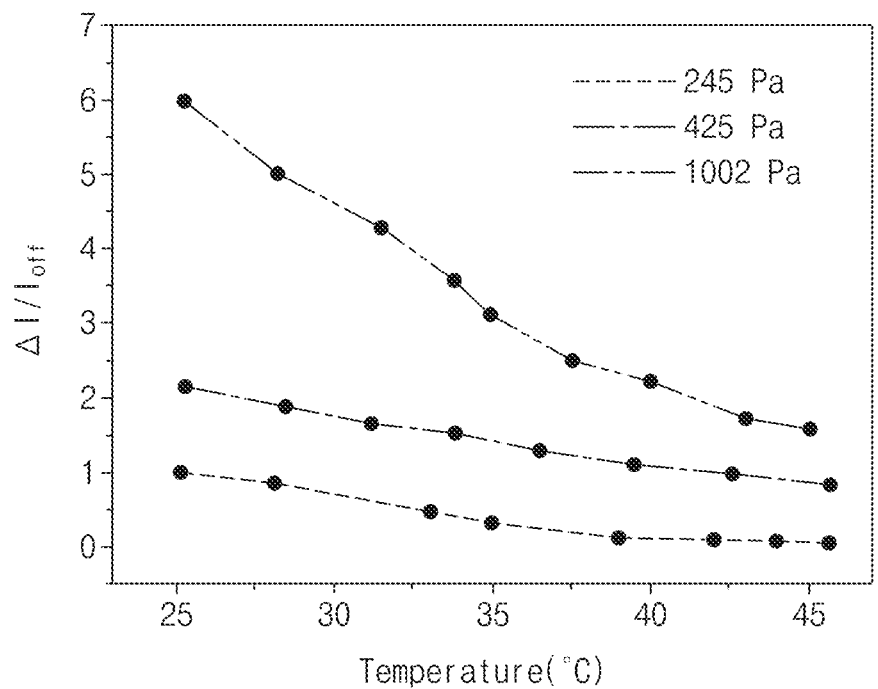
FIG. 3D shows a pressure sensing capability for a temperature variation with many external forces.

FIG. 3D shows a pressure sensing capability for a temperature variation with many external forces.

Referring to FIG. 3D, as a temperature increases to 47 degrees Celsius, a current variation decreases linearly in spite of pressure variation. Decrease in current may result from increase in ionic activity. An EO activity may inhibit ion transmission by impinging ions across a membrane and screening pores of the membrane.

Figure 3E:
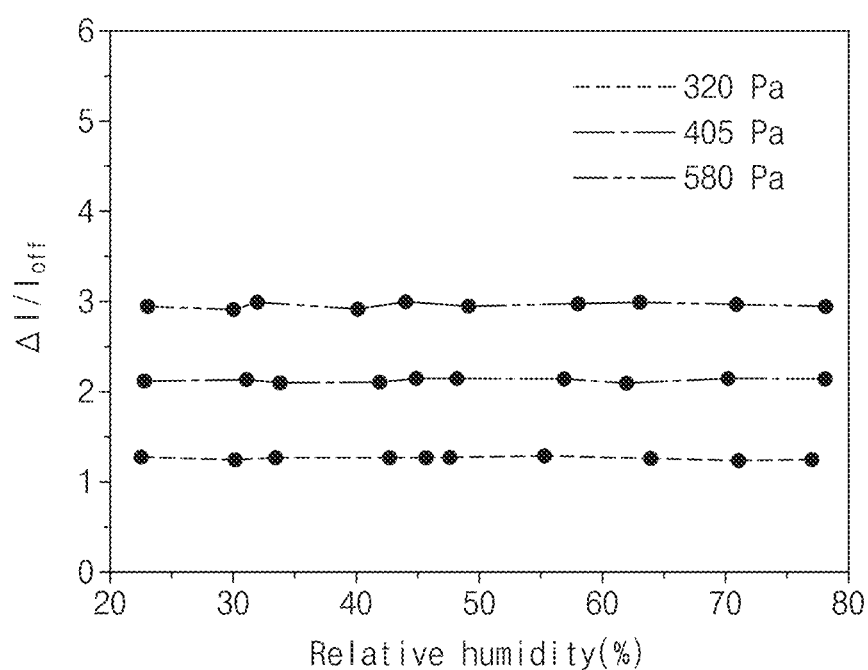
FIG. 3E shows a pressure sensing capability for a humidity variation with many external forces.

FIG. 3E shows a pressure sensing capability for a humidity variation with many external forces.

Referring to FIG. 3E, the ion channel sensor may effectively measure a current variation in terms of humidity variation in the range of 20 80 RH (%). The current variation is constant irrespective of various humidities for various external forces. Since the ion channel pressure sensor does not require an electronic circuit, an amplifier and an electrical element that may be affected by humidity, the operation is possible even in a high humidity range. The ion channel pressure sensor monitored the blood pressure of a human radial artery in real time. We patched the ion channel pressure sensor to a subject's wrist.

Figure 4A:
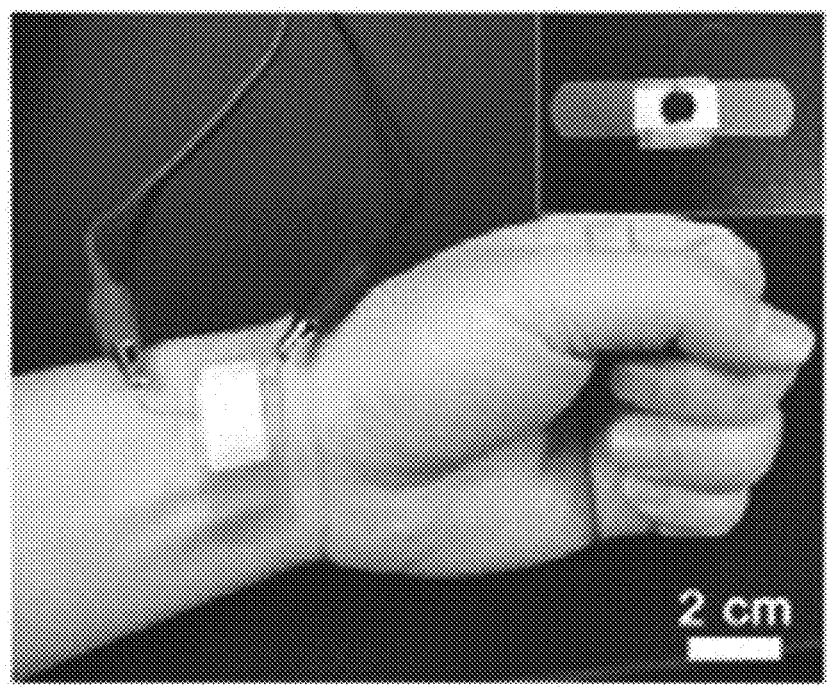
FIG. 4A is an image showing an ion channel sensor patched to a subject's wrist.

FIG. 4A is an image showing an ion channel sensor patched to a subject's wrist.

Figure 4B:
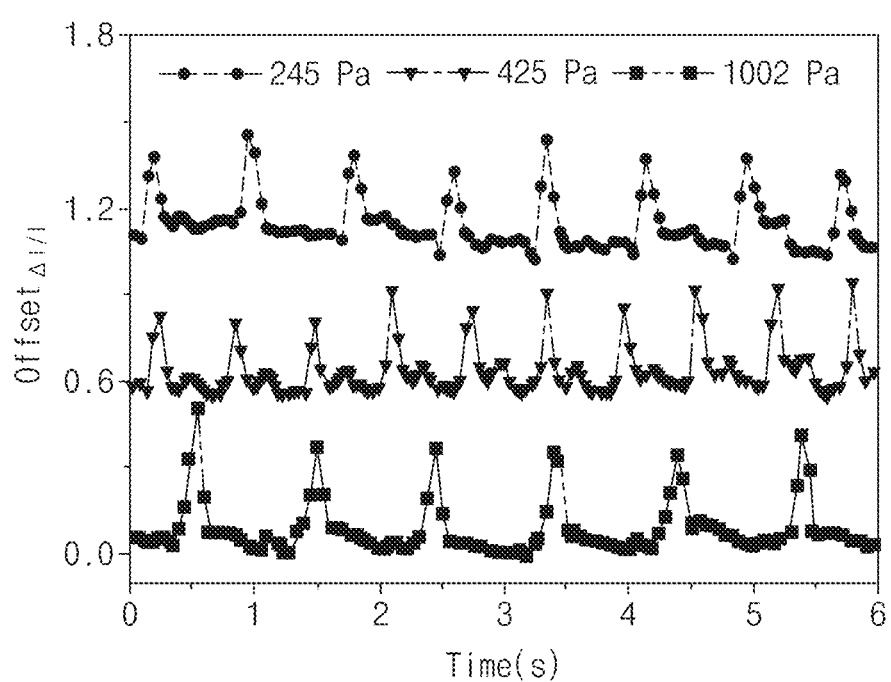
FIG. 4B shows a result of measuring a subject's blood pressure over time.

FIG. 4B shows a result of measuring a subject's blood pressure over time.

Referring to FIGS. 4A and 4B, the blood pressure covers an area of 8×8 mm$^2$ of the ion channel sensor. Wrist pulses of three different persons were investigated. It was observed that three persons had different current amplitudes and frequencies of blood pressure pulse.

Figure 5A:
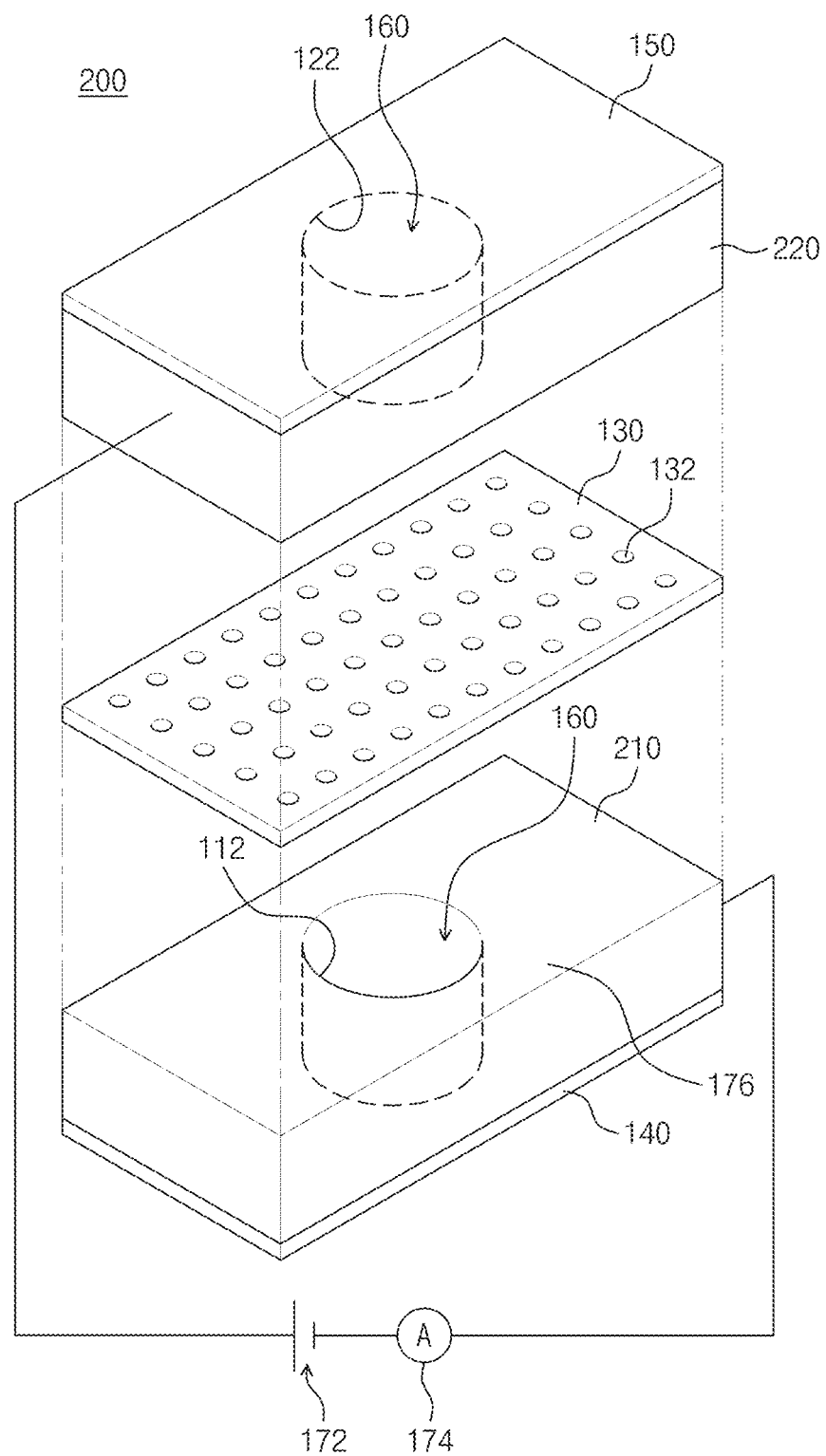
FIG. 5A is an exploded perspective view of an ion channel sensor according to another example embodiment of the present disclosure.

FIG. 5A is an exploded perspective view of an ion channel sensor according to another example embodiment of the present disclosure.

Figure 5B:
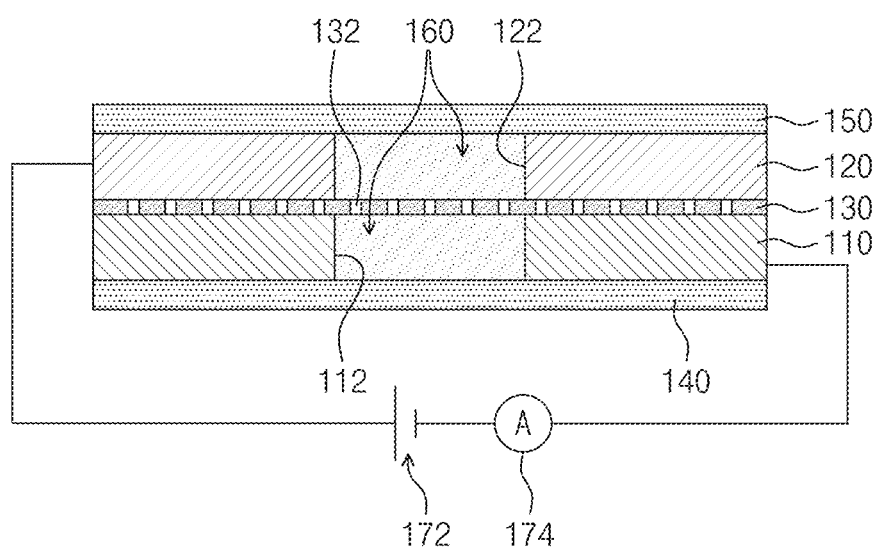
FIG. 5B is a cross-sectional view of the ion channel sensor in FIG. 5A.

FIG. 5B is a cross-sectional view of the ion channel sensor in FIG. 5A.

Referring to FIGS. 5A and 5B, an ion channel sensor 200 includes a bottom storage 210, a top storage 220, a membrane 130, a bottom support 140, a top support 150, a power supply 172, and an ammeter 174. The bottom storage 210 includes a bottom storage space 112 in which an electrolyte 160 is stored. The top storage 220 includes a top storage space 122 in which an electrolyte 160 is stored. The membrane 130 is disposed between the bottom storage 210 and the top storage 220 and includes a plurality of through-holes 132. The bottom support 140 is disposed on a bottom surface of the bottom storage 210 and has a plate shape. The top support 150 is disposed on a top surface of the top storage 220 and has a plate shape. The power supply 172 applies a voltage between the electrolyte 160 stored in the bottom storage space 112 and the electrolyte 160 stored in the top storage space 122. The ammeter 174 detects a current flowing to the power supply 172. The top support 150 is deformed by an external pressure, the bottom storage space 112 is vertically aligned with the top storage space 122, and the electrolyte 160 is allowed to moves through the through-hole of the membrane 174 by the external pressure.

Each of the top and bottom storages 220 and 210 may be a conductive film. More specifically, each of the top and bottom storages 220 and 210 may be a carbon film. Accordingly, a top electrode and the top storage 220 may be integrated into one body and may be directly electrically connected at the outside of the bottom storage 210.

Figure 6A:
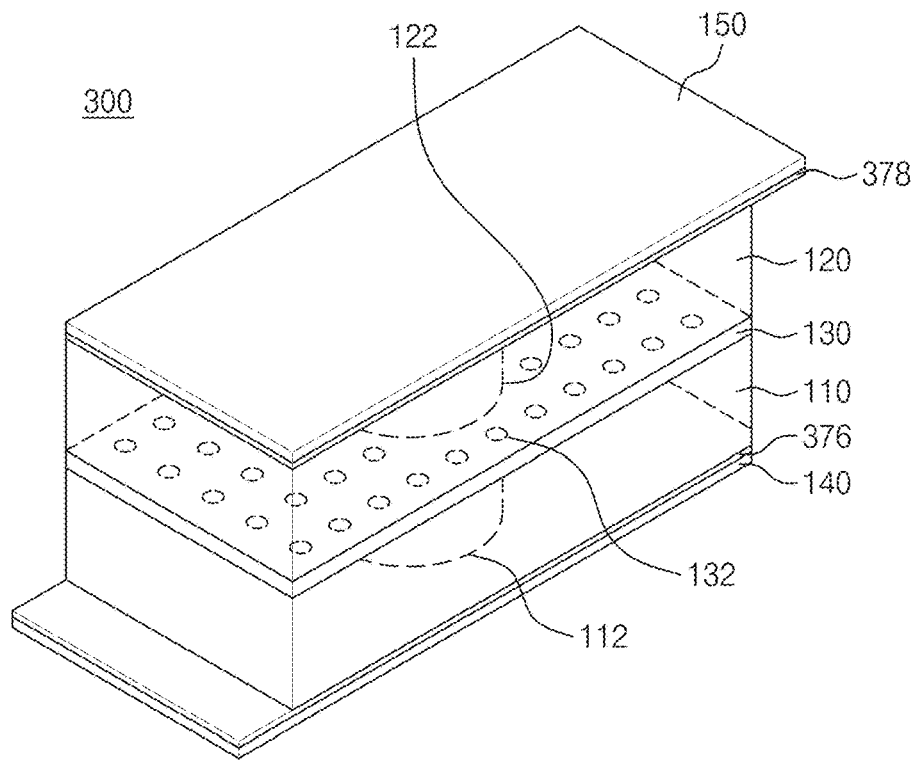
FIG. 6A is an exploded perspective view of an ion channel sensor according to another example embodiment of the present disclosure.

FIG. 6A is an exploded perspective view of an ion channel sensor according to another example embodiment of the present disclosure.

Figure 6B:
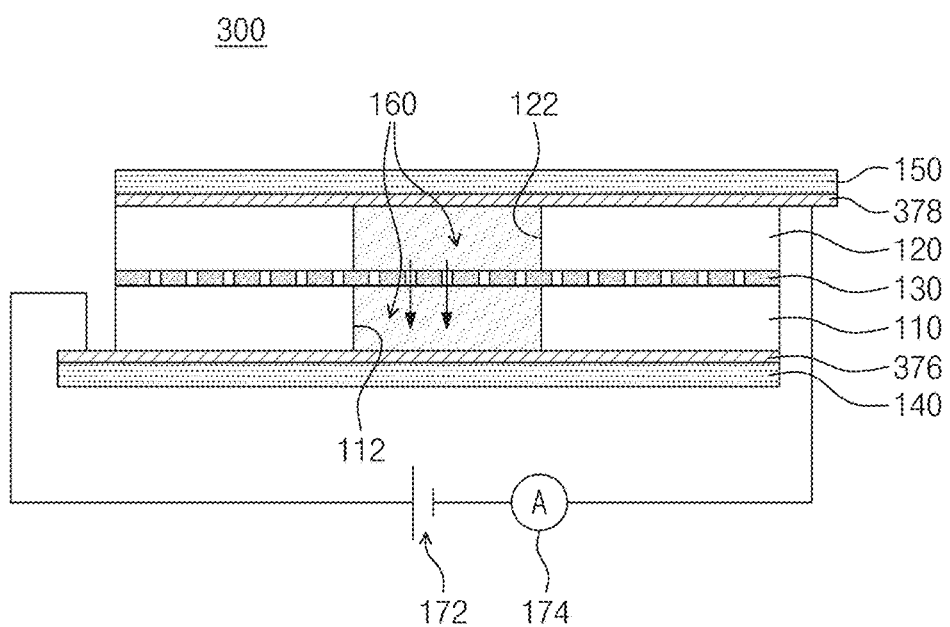
FIG. 6B is a cross-sectional view of the ion channel sensor in FIG. 6A.

FIG. 6B is a cross-sectional view of the ion channel sensor in FIG. 6A.

Referring to FIGS. 6A and 6B, an ion channel sensor 300 includes a bottom storage 110, a top storage 120, a membrane 130, a bottom support 140, a top support 150, a power supply 172, and an ammeter 174. The bottom storage 110 includes a bottom storage space 112 in which an electrolyte 160 is stored. The top storage 120 includes a top storage space 122 in which an electrolyte 160 is stored. The membrane 130 is disposed between the bottom storage 210 and the top storage 220 and includes a plurality of through-holes 132. The bottom support 140 is disposed on a bottom surface of the bottom storage 210 and has a plate shape. The top support 150 is disposed on a top surface of the top storage 220 and has a plate shape. The power supply 172 applies a voltage between the electrolyte 160 stored in the bottom storage space 112 and the electrolyte 160 stored in the top storage space 122. The ammeter 174 detects a current flowing to the power supply 172. The top support 150 is deformed by an external pressure, the bottom storage space 112 is vertically aligned with the top storage space 122, and the electrolyte 160 is allowed to moves through the through-hole of the membrane 174 by the external pressure.

A top electrode 378 may be disposed between the top storage space 122 of the top storage 120 and the top support 150 and be coated with a conductor on one surface of the top support 150. A material of the top electrode 378 may be a multilayer structure of Ag/AgCl or a single-layer structure such as platinum (Pt).

A bottom electrode 376 may be disposed between the bottom storage space 112 of the bottom storage 110 and the bottom support 140 and be coated with a conductor on one surface of the bottom support 140. A material of the bottom electrode 376 may be a multilayer structure of Ag/AgCl or a single-layer structure such as platinum (Pt). The top electrode 378 and the bottom electrode 376 are electrically connected to the power supply 172.

As described above, an ion channel sensor according to example embodiments of the present disclosure may sense a pressure in a wide range area with low power without an electronic circuit such as an amplifier by adopting a receptor and an electrolyte part of various materials. In addition, the ion channel sensor includes a flexible storage which is capable of packaging electrolytes in top and bottom portions of a flexible membrane to be implemented in a patch and wearable form. As a result, miniaturization and lightweight of the ion channel sensor may be achieved.

Although the present disclosure and its advantages have been described in detail, it should be understood that various changes, substitutions and alterations can be made herein without departing from the spirit and scope of the disclosure as defined by the following claims.

What is claimed is:

1. An ion channel pressure sensor comprising:
a bottom storage including a bottom storage space in which an electrolyte is stored;
a top storage including a top storage space in which an electrolyte is stored;
a membrane disposed between the bottom storage and the top storage, the membrane including a plurality of through-holes;
a plate-shaped bottom support disposed on a bottom surface of the bottom storage;
a plate-shaped top support disposed on a top surface of the top storage;
a power supply configured to apply a voltage between the electrolyte stored in the bottom storage space and the electrolyte stored in the top storage space; and
an ammeter configured to detect a current flowing to the power supply,
wherein:
the top support is defined by an external pressure,
the bottom storage space is vertically aligned with the top storage space, and
the electrolyte is allowed to move through the through-hole of the membrane by the external pressure.

2. The ion channel pressure sensor as set forth in claim 1, wherein:
the electrolyte includes polyaniline (PANi).

3. The ion channel pressure sensor as set forth in claim 1, wherein:
the top support includes a polyvinylidene fluoride (PVDF) film, a mica film or a glass film.

4. The ion channel pressure sensor as set forth in claim 1, wherein:
the top storage includes a silicon-based tape or a carbon tape.

5. The ion channel pressure sensor as set forth in claim 1, wherein:
the top support has the same structure and shape as the bottom support, and
the top storage has the same structure and shape as the bottom storage.

6. The ion channel pressure sensor as set forth in claim 1, wherein:
the membrane includes polycarbonate track etched (PCTE).

7. The ion channel pressure sensor as set forth in claim 1, wherein:
a diameter of the through-hole of the membrane is between 10 nanometers (nm) and 1 micrometer (μm), a density of the through-hole of the membrane is between $2\times10^7/cm^2$ and $6\times10^8/cm^2$, and a thickness of the membrane is between 6 and 11 μm.

8. The ion channel pressure sensor as set forth in claim 1, wherein:

each of the top and bottom storages is made of a conductive material.

9. The ion channel pressure sensor as set forth in claim 1, further comprising:

a top electrode disposed between a bottom surface of the top support and a top surface of the top storage to extend and disposed in a contact space with the electrolyte stored in the top storage space; and a bottom electrode disposed between a top surface of the bottom support and a bottom surface of the top storage to extend and disposed in a contact space with the electrolyte stored in the bottom storage space, wherein:

the top and bottom electrodes are wire-type electrodes, and the top and bottom electrode are electrically connected to the power supply.

10. The ion channel pressure sensor as set forth in claim 1, further comprising:

a top electrode disposed between the top storage space of the top storage and the top support; and a bottom electrode disposed between the bottom storage space of the bottom storage and the bottom support, wherein:

the top and bottom electrodes are electrically connected to the power supply.

11. A manufacturing method of an ion channel pressure sensor, comprising:

mounting a bottom storage on a bottom support, the bottom storage including a bottom storage space in which an electrolyte is stored;

installing a membrane including a plurality of through holes on the bottom storage;

installing a top storage on the membrane, the top storage including a top storage space in which an electrolyte is stored; and installing a top support on the top storage, wherein:

the top storage and the bottom storage are symmetrical with respect to the membrane.

12. The manufacturing method as set forth in claim 11, wherein:

the top support and the top storage are fixed by an adhesive, and the bottom support and the bottom storage are fixed by an adhesive.

* * * * *